United States Patent
Jaaskelainen

(10) Patent No.: US 9,002,152 B2
(45) Date of Patent: Apr. 7, 2015

(54) MITIGATION OF RADIATION INDUCED ATTENUATION

(75) Inventor: Mikko Jaaskelainen, Katy, TX (US)

(73) Assignee: SensorTran, Inc., Houston, TX (US)

( * ) Notice: Subject to any disclaimer, the term of this patent is extended or adjusted under 35 U.S.C. 154(b) by 410 days.

(21) Appl. No.: 13/695,642

(22) PCT Filed: Apr. 30, 2011

(86) PCT No.: PCT/US2011/000756
§ 371 (c)(1),
(2), (4) Date: Nov. 1, 2012

(87) PCT Pub. No.: WO2011/139347
PCT Pub. Date: Nov. 10, 2011

(65) Prior Publication Data
US 2013/0042415 A1   Feb. 21, 2013

Related U.S. Application Data

(60) Provisional application No. 61/343,808, filed on May 4, 2010.

(51) Int. Cl.
*G02B 6/00* (2006.01)
*G01K 11/32* (2006.01)

(52) U.S. Cl.
CPC ...................................... *G01K 11/32* (2013.01)

(58) Field of Classification Search
CPC .............. G01N 21/7703; G01D 5/353; G01K 11/3213; G01K 11/32
USPC ......... 385/12; 8/103; 374/161, 131, 121, 137; 702/99
See application file for complete search history.

(56) References Cited

U.S. PATENT DOCUMENTS

| | | | |
|---|---|---|---|
| 5,478,371 A | 12/1995 | Lemaire et al. | |
| 5,983,673 A | 11/1999 | Urano et al. | |
| 6,706,455 B1 | 3/2004 | Canning et al. | |
| 6,857,293 B2 | 2/2005 | Carpenter et al. | |
| 7,369,730 B2 | 5/2008 | Childers | |
| 7,394,959 B2 | 7/2008 | Breuls et al. | |
| 7,421,172 B2 | 9/2008 | Matthijse et al. | |
| 7,628,531 B2 * | 12/2009 | Lee et al. ............ | 374/1 |

(Continued)

FOREIGN PATENT DOCUMENTS

| EP | 1020413 B1 | 10/2001 |
|---|---|---|
| WO | 03/098176 A1 | 11/2003 |

OTHER PUBLICATIONS

Regnier, E.; et al. Recent Developments in Optic Fibers and How Defense, Security and Sensing Can Benefit, 2009, pp. 1-10, Draka Communications, Claremont, NC, USA, www.drakafibre.com.
Regnier, E.; et al. Recent Developments in Optic Fibers and How Defense, Security and Sensing Can Benefit, SPIE Defense, Security, Sensing Presentation, Apr. 16, 2009, Draka Communications.

*Primary Examiner* — Ellen Kim
(74) *Attorney, Agent, or Firm* — Michael A. Ervin; Krueger Iselin LLP

(57) ABSTRACT

A DTS system resistant to radiation induced attenuation losses during the service life of an installation at both low and high temperatures using matched multi-wavelength distributed temperature sensing automatic calibration technology in combination with designed Pure Silica Core (PSC) optical fibers and an in process photo bleaching method provided by the light sources of the distributed temperature sensing system.

9 Claims, 4 Drawing Sheets

(56) References Cited

U.S. PATENT DOCUMENTS

| | | | |
|---|---|---|---|
| 8,152,370 B2* | 4/2012 | Martinelli et al. | 374/161 |
| 8,926,173 B2* | 1/2015 | Lee | 374/137 |
| 2006/0248925 A1 | 11/2006 | Sanders et al. | |
| 2007/0183728 A1 | 8/2007 | Breuls et al. | |
| 2007/0229816 A1 | 10/2007 | Chen et al. | |
| 2009/0310642 A1 | 12/2009 | Skinner | |
| 2013/0156066 A1* | 6/2013 | Kwon et al. | 374/161 |

* cited by examiner

MITIGATION OF RADIATION INDUCED ATTENUATION

BACKGROUND AND FIELD OF THE DISCLOSURE

1. Field

This description relates to the use of optical fiber distributed temperature systems used in ionizing radiation environments and particularly to the use of in process photo bleaching of optical fibers in combination with selected multi wavelength DTS technology.

2. Background

Optical signals propagating through fibers experience induced attenuation or "darkening" when the fiber is exposed to ionizing radiation. This radiation-induced attenuation (or RIA) causes optical signal loss that degrades performance of optical sensor and communication systems. These radiation-induced losses are both transient and permanent in common telecommunications-grade optical fibers.

Despite this issue optical fibers are often of interest in radiation environments. Compared to copper cables, fiber optic systems have many advantages, including good electromagnetic immunity and chemical stability, low weight and compactness, good reliability, and high data rates.

Radiation induced attenuation in silica optical fibers is typically due to the presence of glass structural defects such as non bridging oxygen centers, alkali electron centers, and lattice vacancies in the silica network. Under ionizing radiation, carriers travel to these defect sites and form light-absorbing color centers. These effects are even more prevalent in conventional fibers with refractive index modifying core dopants, such as germanium and phosphorus, as well as fiber containing other glass contaminants. The more complex glass network formed with the addition of these dopants leads to a higher incidence of structural defects, such that these dopants are considered radiation-sensitizing agents.

For application in environments with high radiation, such as nuclear and hydrogen environments, pure silica core optical fibers containing no refractive index modifying dopants have been developed and proposed. Manufacturers such as Sumitomo Electric Industries in Japan offer pure silica core fibers with index lowering doped cladding glasses that show improved performance under these environments. These fibers are manufactured under ultra-pure and highly oxidizing conditions leading to glass with low levels of defects and virtually free from contaminants.

Despite this high purity processing, however, these fibers still exhibit some radiation sensitivity, albeit at low levels when compared to conventional optical fibers. Under radiation exposure, these fibers will exhibit some attenuation that typically grows linearly with radiation exposure dosage. Upon removal from the radiation environment, these fibers typically recover almost completely to their original transparency.

For typical digitally modulated communications optical systems, this slight transient attenuation and associated signal loss can be accommodated through proper link design to ensure an adequate power budget to maintain a required level of optical signal to noise ratio. However for other types of systems, such as optical sensing systems, even slight signal power loss can lead to significant measurement errors. For example, in some intensity modulated sensors, radiation induced losses are not distinguishable from the measured signal (measurand). In some high sensitivity interferometric sensors, such as interferometric fiber optic gyroscopes (IFOGs) used in guidance systems, transient signal loss can affect the sensor scale factor and random noise performance. This becomes especially problematic for such sensors to maintain performance when operating in hostile nuclear environments.

Optical fiber systems that exhibit negligible sensitivity to radiation are thus desired for such applications.

A number of approaches have been made to address this need. Most of them involve the development of special radiation hardened fibers prepared during the manufacturing process of the fibers. Some of these approaches attempt to leverage the performance realized in pure silica core fibers. Most of the others involve various methods of treating the fibers with various dopants and then applying various secondary or post-processing "conditioning" steps to create and anneal residual defects in the glass for improved radiation insensitivity. Some of these conditioning steps include photo-hardening or photo-bleaching of the fiber with intense light launched down the fiber.

Optical fibers are typically formed by heating and drawing an optical fiber preform. The preform typically includes a core and surrounding cladding, with the core and/or cladding possibly doped with appropriate materials to achieve a desired refractive index. In order to guide light through the core, the materials of the core and cladding are selected such that the refractive index of the core is at least slightly higher than the cladding.

In an example photo-hardening treatment in US Patent application 20060248925 to Sanders, et. al. a pure silica core single mode fiber operating at 1550 nm is first hydrogenated by exposing the fiber to hydrogen gas in a pressurized and heated chamber. The fiber is then illuminated to photo-condition (e.g., to photo-anneal or photo-bleach) the defects. 10 W of 488 nm laser light from an argon-ion laser was launched into one end of the fiber spool to promote photo-bleaching. The fiber could be held in this launch position for 5 to 7 days, whereupon it is removed and preconditioning of the fiber is complete.

Other treatments have been proposed, with other dopants and other light sources. In all of these the goal is to create a fiber that has a fairly permanent hardening that reduces radiation induced attenuation.

These approaches can be fairly effective but result in very expensive optical fibers.

There is a need for another approach that can use more conventional fibers but maintain a more consistent performance related to radiation induced attenuation.

SUMMARY OF THE DISCLOSURE

The aforementioned need is met with the inventive step of this application. The concept is to use photo bleaching of deployed optical fibers to reduce the impact of radiation induced attenuation and to do that in combination with a multi-wavelength distributed temperature sensing (DTS) system during system operation.

In one aspect in process photo bleaching is provided by periodically (in a non measurement mode) significantly increasing the light power of one or both light sources of a dual light source DTS system. By this periodic photo bleaching the fiber is hardened to radiation induced attenuation. The system is then switched back to a dual wavelength measurement mode. In that dual wavelength mode there are three possibilities: In possibility 1 a DTS system with dual wavelength light sources is chosen so that the anti-Stokes light component of the primary light source is essentially the same as the Stokes component of the secondary light source. In operation this is done by first, in a measurement mode, providing the primary light source light pulse energy into a sensing fiber; then collecting backscattered Raman Stokes and anti-Stokes light components; calculating temperatures using the intensities of the backscattered Raman Stokes and anti-Stokes light components; then during a correction mode selecting the secondary light source and providing pulses of said secondary light source to the sensing fiber; collecting a backscattered Raman Stokes component of that secondary light source; using that Raman Stokes component collected from the secondary light source in said correction mode to correct a Raman anti-Stokes profile collected from the primary light source while in measurement mode; and calculating a corrected temperature from the corrected anti-Stokes profile.

In possibility 2 a DTS system with the same dual wavelength sources can again be used but in a different manner. In operation this is done by first, injecting primary light energy into a sensor fiber using a primary light source; then collecting backscattered Rayleigh and anti-Stokes light components from the primary light energy; and measuring the attenuation of the backscattered Rayleigh light component and using it to correct the anti-Stokes light components; then injecting secondary light energy into the sensor fiber using a secondary light source; and collecting backscattered Rayleigh and Stokes light components of that secondary light source; then measuring the attenuation of the backscattered Rayleigh light component and using it to correct the Stokes light components; and calculating a temperature using the ratio of the corrected back-scattered anti-Stokes signal of the primary light energy and the corrected back-scattered Stokes signal of the secondary light energy.

In a third possibility a DTS system may be chosen so that the anti-Stokes light component of the primary light source is essentially the same as the wavelength of the secondary light source. In operation this is done by first, injecting primary light energy into a sensor fiber using the primary light source; collecting back-scattered light energy at the Raman anti-Stokes wavelength of the primary light energy and measuring its intensity; injecting secondary light energy into the fiber at the Raman anti-Stokes wavelength of the primary light energy using a secondary light source; collecting back-scattered light energy at the Raman Stokes wavelength of the secondary light energy and measuring its intensity; and calculating a temperature using the back-scattered anti-Stokes signal of the primary light energy and the back-scattered Stokes signal of the secondary light energy.

All three of these temperature measurement modes can also be used in a second photo bleaching aspect. In this embodiment process photo bleaching is provided by periodically (in a non measurement mode) blasting the optical fiber with a high light power from a third light source. By this periodic photo bleaching the fiber is hardened to radiation induced attenuation. The system is then switched back to a dual wavelength measurement mode. Once back in the measurement (auto correction) mode the same three dual wavelength auto correction mode possibilities discussed in conjunction with the first photo bleaching embodiment can be used.

The three temperature measurement modes can also be used in a third photo bleaching aspect. A third light source at a different wavelength is again used at a high light power but in a continuous mode to provide steady photo-bleaching. The signal light sources can then be used continuously in the measurement (auto correction) mode and again all three possibilities of auto correction as discussed above can be used.

BRIEF DESCRIPTION OF THE SEVERAL VIEWS OF THE DRAWINGS

Preferred embodiments and their advantages are best understood by reference to FIGS. 1 through 5.

DETAILED DESCRIPTION

Although certain embodiments and their advantages have been described herein in detail, it should be understood that various changes, substitutions and alterations can be made without departing from the spirit and scope as defined by the appended claims. Moreover, the scope is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

Figure 1:
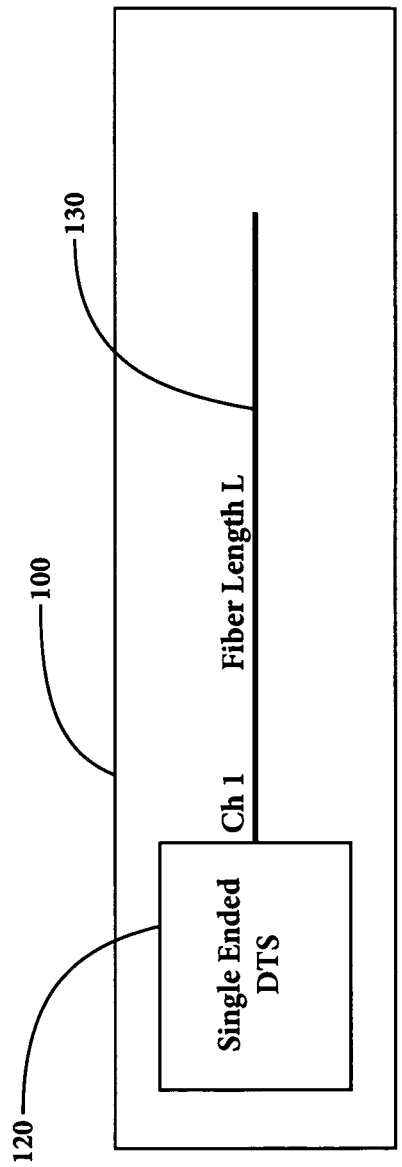
FIG. 1 illustrates a single ended DTS system.

The classical way to measure distributed temperature using Raman scattering is to send a single pulse at wavelength $\lambda_0$ down the optical fiber and measure backscattered Raman Stokes ($\lambda_s$) and anti-Stokes ($\lambda_{as}$) components as a function of time. Time of flight will allow a calculation of the location, and the temperature can be calculated as a function of the ratio between the intensity of the anti-Stokes and Stokes components at any given location. FIG. 1 shows a single ended system.

Fiber attenuation due to absorption and Rayleigh scattering introduce wavelength dependent attenuation. The peak wavelengths of the Stokes and anti-Stokes components are separated by 13 [THz] from the transmitted pulse. A system operating at $\lambda_0$=1550 nm produces Stokes wavelength $\lambda_s$ at 1650 nm and anti-Stokes wavelength $\lambda_{as}$ at 1450 nm. This difference in wavelength dependent optical attenuation ($\Delta\alpha$) between the Stokes and anti-Stokes wavelengths must be compensated for. This is often added to the fundamental Raman equation below where the impact of differential attenuation $\Delta\alpha$ is corrected for over distance z.

$$R(T) = \frac{I_{AS}}{I_S} = \left(\frac{\lambda_s}{\lambda_{as}}\right)^4 \cdot \exp\left(-\frac{hcv'}{kT}\right) \cdot \exp(-\Delta\alpha z)$$

The underlying fundamental assumption for accurate temperature measurements with a single wavelength DTS system is a constant differential attenuation $\Delta\alpha$.

This assumption is not valid in many applications. Examples of situations where the differential loss $\Delta\alpha$ varies are cabling induced bends, radiation induced attenuation or hydrogen-induced attenuation to name a few.

Advantages of a classical single ended system are the simple deployment and long reach in applications where the differential attenuation between Stokes and anti-Stokes components remain constant.

Disadvantage of a classical single wavelength DTS system is that it will experience significant measurement errors due to wavelength dependent dynamic attenuation when e.g. the fiber is exposed to ionizing radiation. The total increase in optical attenuation in many fibers may be in the order of 10's of dB/km, and may exceed the dynamic range of the system.

Figure 2:
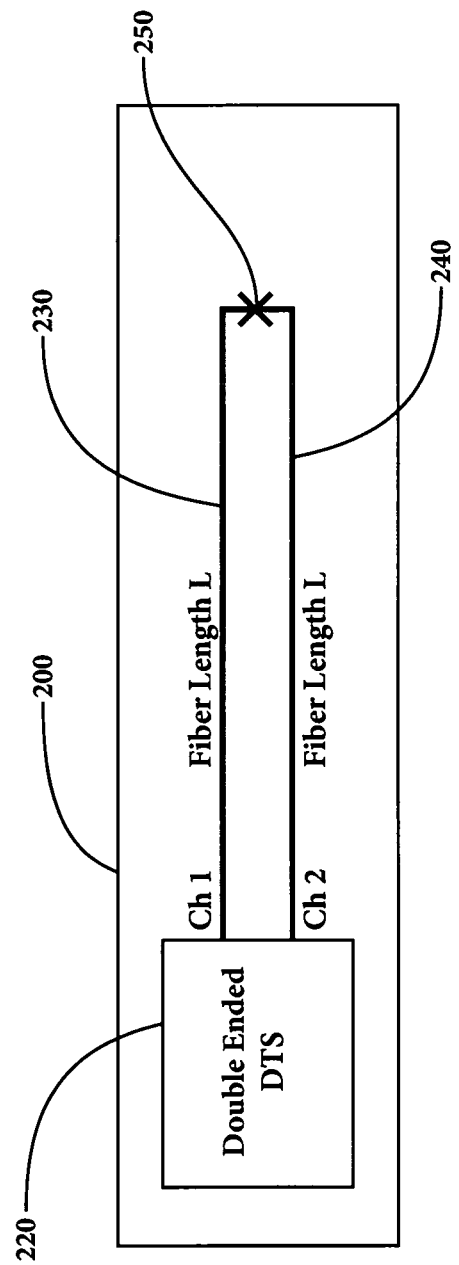
FIG. 2 illustrates a double ended DTS system.

The impact of varying differential attenuation $\Delta\alpha$ can be mitigated using single wavelength DTS systems with double ended fiber deployments. FIG. 2 shows a double-ended system.

A fiber is deployed in a loop configuration and a full temperature trace is taken from channel 1 to channel 2 for a total fiber length of 2 L. A second full temperature trace is taken from channel 2 giving two temperature points at every point along the sensing fiber. Using this information, the differential attenuation factor $\Delta\alpha$ can be calculated at every location along the optical fiber. This distributed differential attenuation factor $\Delta\alpha(z)$ can then be used to calculate a corrected temperature trace.

There are several issues to be aware of and to consider when considering using a double-ended system.
1. Using twice the fiber length requires twice the optical budget on the DTS instrument. This often limits double-ended system performance while reducing any margin in the optical budget.
2. Interrogating sensing fibers from two directions require twice the optical connections and drives system complexity.
3. Twice the fiber is exposed to the environment so radiation induced attenuation will create twice the attenuation increase in a loop when compared to a single ended system.
4. The noise increases exponentially with distance as the signal levels decrease due to fiber attenuation, and this noise term show up in the distributed differential attenuation factor over distance $\Delta\alpha(z)$ and temperature trace.

Numbers 1 and 2 increase the total system cost while adding deployment complexity. Number 3 reduces the service life of the system. Number 4 impacts the quality of the data, which in turn makes the interpretation of temperature data more difficult. In many installations, it is impractical or even impossible to deploy double-ended systems.

The advantage of a double-ended system is the ability to correct for dynamic differential attenuation changes. The disadvantages are cost, complexity, system performance and data quality.

An alternate is the use of a single ended multi-laser technology. It addresses all of the issues with a double-ended system, while providing all the benefits of a single ended system. The type of system can be designed to be more tolerant to wavelength dependent attenuation. Careful selection of the laser wavelengths will provide signal paths with equal amount of round-trip attenuation for the launched light and backscattered Stokes and anti-Stokes components thus eliminating the effect of distributed differential attenuation $\Delta\alpha(z)$. The performance of a multi wavelength system will be illustrated in FIGS. 3 thru 5.

Figure 3:
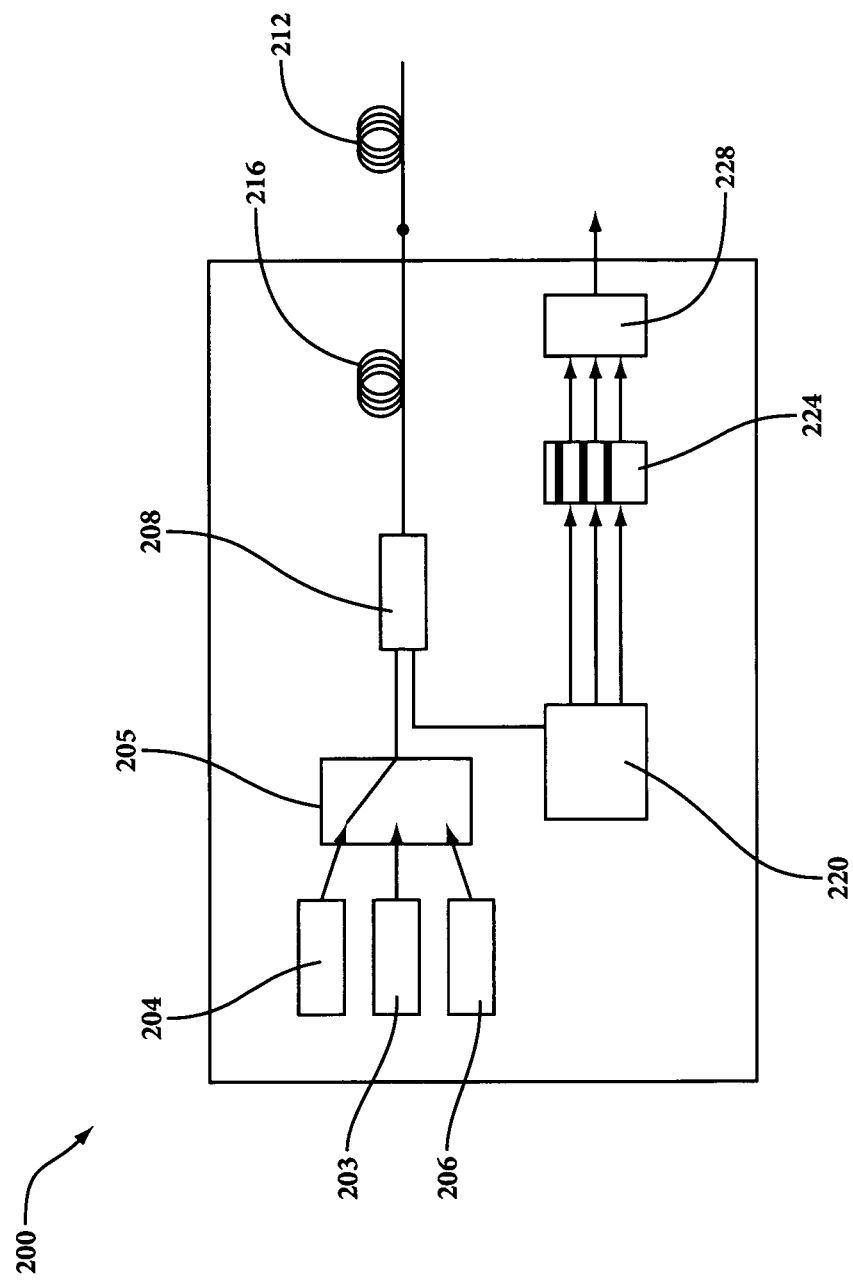
FIG. 3 illustrates a distributed temperature sensing system.

FIG. 3, shown generally as the numeral 200 shows a block diagram of an multi-wavelength DTS system capable of performing a self-calibration or auto correction method according to one embodiment. Primary light source 204 (wavelength $\lambda_1$) and secondary light source 206 (wavelength $\lambda_2$) may alternatively feed primary and secondary optical signals into sensing fiber 212 and reference fiber coil 216 via optical switch 205. When optical switch 205 is in a first position, primary source 204 produces primary back-scattered signals from sensing fiber 212. When optical switch 205 is in a second position, secondary source 206 produces secondary back-scattered signals from sensing fiber 212. Optical combiner/splitter 208 directs these mixed spectral components to optical filter 220, which separates the back-scattered components into the bands of interest, which may be the Rayleigh, Raman Stokes and Raman anti-Stokes frequencies of the primary or secondary light sources and then feeds them into photo-detectors 224. Three photo detectors are shown for illustrative purposes, but more are possible. The signals from photo-detectors are fed to a programmed signal processor 228 that outputs temperature as a function of location along sensing fiber 212. A third light source 203 may optionally be in the system as a photo bleaching light source.

Figure 4:
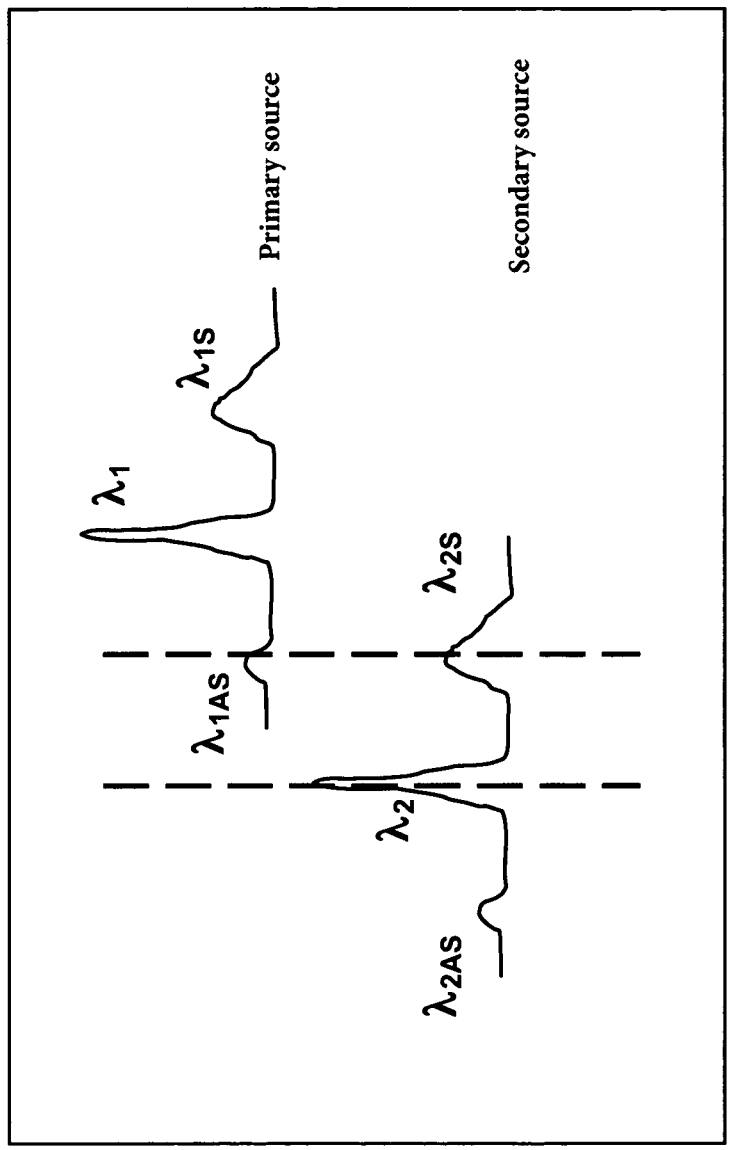
FIG. 4 illustrates one choice of a primary and secondary light source pair.

One embodiment is to choose the secondary or correction light source so that the backscattered Stokes band is a close match to the backscattered anti-Stokes band of the primary or measurement light source. This is illustrated in FIG. 4. The secondary light source's Stokes attenuation profile may be used to correct the anti-Stokes profile made by the primary light source during a measurement mode. Thus, the generation of an extra wavelength band via a second light source that may be insensitive to temperature effects and corresponds to an anti-Stokes band of the DTS unit (e.g., primary light source) may be used to correct temperature error induced by anti-Stokes profile in the first primary light source. Thus two like bands, one from the anti-Stokes of a primary light source (in measurement mode) and the other from the Stokes band of the secondary light source (in correction mode) may pass through a wavelength selector and then be detected with an optical detector.

A proven example of this embodiment is a commercially available measurement light source of primary wavelength of 1064 (nm). This has an anti-Stokes band of wavelength 1018.7 (nm) and a Stokes band of wavelength 1109.3 (nm). Then a correcting light source is a commercially available one with a primary wavelength of 980 (nm) and an anti-Stokes of 941.6 (nm) with a Stokes of 1018.4 (nm). The anti-Stokes band (1018.7) of the measurement source is almost identical to the Stokes band (1018.4) of the correction source.

Figure 5:
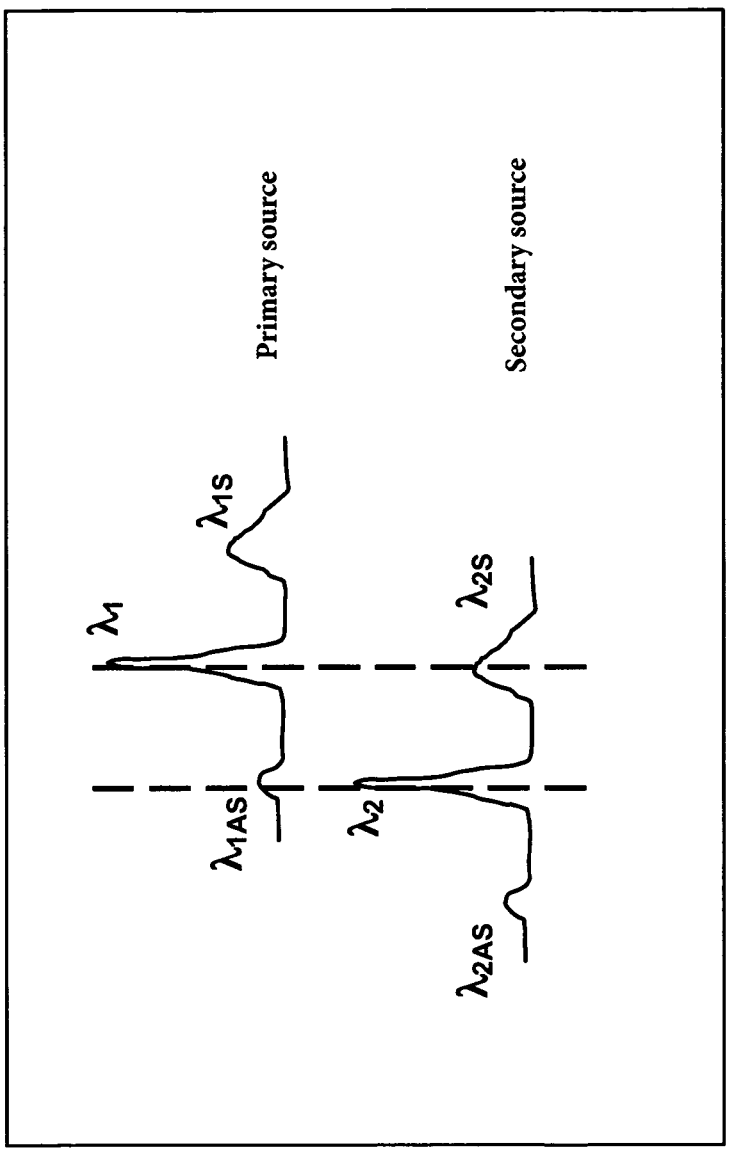
FIG. 5 illustrates another choice of a primary and secondary light source pair.

In a second embodiment, the wavelength of the secondary source ($\lambda_2$) is chosen to coincide with the anti-Stokes wavelength ($\lambda_{1\_AS}$) of the primary source. This is shown in FIG. 5. If a secondary source wavelength $\lambda_2$ is chosen to match the anti-Stokes wavelength ($\lambda_{1\_AS}$) of the primary source then the Stokes wavelength of the secondary source ($\lambda_{2\_S}$) is a close match to the primary source wavelength. This configuration eliminates the need to use any Rayleigh signal for adjustments, and accurate temperature may be measured using only the Stokes and anti-Stokes signals.

A proven example of this second embodiment is a commercially available measurement light source of primary wavelength of 975 (nm) coupled with a correcting light source of 940 (nm).

In some embodiments, the primary light source and the secondary light source may be the same light source, i.e., a dual wavelength laser source operable to provide at least two optical signals to the sensing fiber. In this case an optical switch may not be needed. The dual wavelength laser source may operate at a first wavelength and at least the anti-Stokes band may be collected. Next, the dual wavelength laser source may operate at a second wavelength and at least the Stokes band may be collected, where the anti-Stokes and Stokes band are substantially similar.

To further address the issue of radiation induced attenuation this disclosure further makes use of in process photo bleaching of the optical fiber. Photo bleaching reduces the impact of radiation-induced attenuation. Radiation induced attenuation decreases with increased power in the optical fiber. Several embodiments or combinations of in process photo bleaching with multi-wavelength laser systems are proposed. Each embodiment combines a high power source with a multi-wavelength distributed temperature system and blasts the fiber with optical power to reduce the radiation-induced attenuation.

One photo-bleaching embodiment is a system as shown in FIG. 3 but without a third (203) light source. In this embodiment in process photo bleaching is provided by periodically (in a non measurement mode) significantly increasing the light power of either or both of light source 204 and 206. By this periodic photo bleaching the fiber is hardened to radiation induced attenuation. The system is then switched back to a dual wavelength measurement mode.

In this dual wavelength measurement mode there are three auto-calibrating possibilities as follows:

In possibility 1 a DTS system with dual wavelength light sources as in FIG. 4 are used. An example is a dual 1064 nm (primary) and 980 nm (secondary) sources. These are chosen so that the anti-Stokes light component of the primary light source is essentially the same as the Stokes component of the secondary light source. In operation this is done by first, in a measurement mode, providing the primary light source light pulse energy into a sensing fiber; then collecting backscattered Raman Stokes and anti-Stokes light components; calculating temperatures using the intensities of the backscattered Raman Stokes and anti-Stokes light components; then during a correction mode selecting the secondary light source and providing pulses of said secondary light source to the sensing fiber; collecting a backscattered Raman Stokes component of that secondary light source; using that Raman Stokes component collected from the secondary light source in said correction mode to correct a Raman anti-Stokes profile collected from the primary light source while in measurement mode; and calculating a corrected temperature from the corrected anti-Stokes profile.

In possibility 2 a DTS system with a dual 1064 nm (primary) and 980 nm (secondary) can again be used but in a different manner. In operation this is done by first, injecting primary light energy into a sensor fiber using a primary light source; then collecting backscattered Rayleigh and anti-Stokes light components from the primary light energy; and measuring the attenuation of the backscattered Rayleigh light component and using it to correct the anti-Stokes light components; then injecting secondary light energy into the sensor fiber using a secondary light source; and collecting backscattered Rayleigh and Stokes light components of that secondary light source; then measuring the attenuation of the backscattered Rayleigh light component and using it to correct the Stokes light components; and calculating a temperature using the ratio of the corrected back-scattered anti-Stokes signal of the primary light energy and the corrected back-scattered Stokes signal of the secondary light energy.

In possibility 3 a DTS system with a dual wavelength light sources as in FIG. 5 are used. For example 1030 nm (primary) and 990 nm (secondary) are chosen. These are chosen so that the anti-Stokes light component of the primary light source is essentially the same as the wavelength of the secondary light source. In operation this is done by first, injecting primary light energy into a sensor fiber using the primary light source; collecting back-scattered light energy at the Raman anti-Stokes wavelength of the primary light energy and measuring its intensity; injecting secondary light energy into the fiber at the Raman anti-Stokes wavelength of the primary light energy using a secondary light source; collecting back-scattered light energy at the Raman Stokes wavelength of the secondary light energy and measuring its intensity; and calculating a temperature using the back-scattered anti-Stokes signal of the primary light energy and the back-scattered Stokes signal of the secondary light energy.

A second photo bleaching embodiment is one in which there is a third light source 203 in FIG. 3. In this embodiment in process photo bleaching is provided by periodically (in a non measurement mode) blasting the optical fiber with a high light power from light source 203. By this periodic photo bleaching the fiber is hardened to radiation induced attenuation. The system is then switched back to a dual wavelength measurement mode. Once back in the measurement (auto correction) mode the same three dual wavelength auto correction mode possibilities discussed in conjunction with the first photo bleaching embodiment can be used.

A third photo-bleaching embodiment is one in which the third light source 203 at a different wavelength is again used at a high light power but in a continuous mode to provide steady photo-bleaching. The signal light sources 204, 206 can then be used continuously in the measurement (auto correction) mode and again all three possibilities of auto correction as discussed above can be used.

In these embodiments, the primary light source and the secondary light source may also be the same light source, i.e., a dual wavelength laser source operable to provide at least two optical signals to the sensing fiber. In this case optical switches may not be needed. The dual wavelength laser source may operate at the primary wavelength and the key bands may be collected. Next, the dual wavelength laser source may operate to a secondary wavelength and at the remaining key reflected bands may be collected.

In another aspect the two measurement mode lasers (204, 206) use a single pulse modulating circuit to operate the light sources. This aspect provides common modulating parameters for two lasers continuously. It is difficult to synchronize two consecutive pulses with identical condition in parameters such as modulating current amplitude, repetition rate and the pulse widths by utilizing two individual pulse-modulating circuits. Thus this aspect can have a single pulse modulating circuit that drives both the primary light source and the secondary light source.

All of the methods disclosed and claimed herein may be executed without undue experimentation in light of the present disclosure. While the disclosure may have been described in terms of preferred embodiments, it will be apparent to those of ordinary skill in the art that variations may be applied to the components described herein without departing from the concept, spirit and scope of the disclosure. All such similar substitutes and modifications apparent to those skilled in the art are deemed to be within the spirit, scope, and concept of the disclosure as defined by the appended claims.

The invention claimed is:

1. A method for automatic photo-bleaching of deployed optical fibers in a distributed temperature sensing system (DTS) comprising a primary light source and a secondary light source system, the method comprising the steps of:
   a. in a measurement mode providing a primary light source light pulse energy into a sensing fiber;
      i. collecting backscattered Raman Stokes and anti-Stokes light components;
      ii. calculating temperatures using the intensities of the backscattered Raman Stokes and anti-Stokes light components;
   b. during a correction mode selecting a secondary light source and providing pulses of said secondary light source to the sensing fiber;

i. collecting a backscattered Raman Stokes component of that secondary light source;
ii. using that Raman Stokes component collected from the secondary light source in said correction mode to correct a Raman anti-Stokes profile collected from the primary light source while in measurement mode; and
iii. calculating a corrected temperature from the corrected anti-Stokes profile; and
c. in a non-measurement mode periodically increasing the light power of either or both of the primary and secondary light sources to photo-bleach the deployed optical fibers;
d. wherein the primary and secondary light sources are chosen so that the anti-Stokes light component of the primary light source is essentially the same as the Stokes component of the secondary light source.

2. The method for automatic photo-bleaching of deployed optical fibers in a distributed temperature sensing system (DTS) of claim 1 wherein in the non-measurement mode a tertiary light source in the system is used for providing the higher power light for photo-bleaching.

3. The method for automatic photo-bleaching of deployed optical fibers in a distributed temperature sensing system (DTS) of claim 1 wherein the primary light source is a 1064 nm wavelength source and the secondary light source is a 980 nm wavelength source.

4. A method for automatic photo-bleaching of deployed optical fibers in a distributed temperature sensing system (DTS) comprising a primary light source and a secondary light source system, the method comprising the steps of:
a. in a measurement mode;
i. injecting a primary light source light pulse energy into a sensing fiber;
ii. collecting backscattered Rayleigh and anti-Stokes light components from the primary light energy;
iii. measuring the attenuation of the backscattered Rayleigh light component and using it to correct the anti-Stokes light components;
iv. injecting secondary light energy into the sensor fiber using a secondary light source;
v. collecting backscattered Rayleigh and Stokes light components of that secondary light source;
vi. measuring the attenuation of the backscattered Rayleigh light component and using it to correct the Stokes light components;
vii. calculating a temperature using the ratio of the corrected back-scattered anti-Stokes signal of the primary light energy and the corrected back-scattered Stokes signal of the secondary light energy;
b. in a non-measurement mode periodically increasing the light power of either or both of the primary and secondary light sources to photo-bleach the deployed optical fibers;
c. wherein the primary and secondary light sources are chosen so that the anti-Stokes light component of the primary light source is essentially the same as the Stokes component of the secondary light source.

5. The method for automatic photo-bleaching of deployed optical fibers in a distributed temperature sensing system (DTS) of claim 1 wherein in the non-measurement mode a tertiary light source in the system is used for providing the higher power light for photo-bleaching.

6. The method for automatic photo-bleaching of deployed optical fibers in a distributed temperature sensing system (DTS) of claim 4 wherein the primary light source is a 1064 nm wavelength source and the secondary light source is a 980 nm wavelength source.

7. A method for automatic photo-bleaching of deployed optical fibers in a distributed temperature sensing system (DTS) comprising a primary light source and a secondary light source system, the method comprising the steps of:
a. in a measurement mode;
i. injecting primary light energy into a sensor fiber using a primary light source;
ii. collecting back-scattered light energy at the Raman anti-Stokes wavelength of the primary light energy and measuring its intensity;
iii. injecting secondary light energy into the fiber at the Raman anti-Stokes wavelength of the primary light energy using a secondary light source;
iv. collecting back-scattered light energy at the Raman Stokes wavelength of the secondary light energy and measuring its intensity; and
v. calculating a temperature using the back-scattered anti-Stokes signal of the primary light energy and the back-scattered Stokes signal of the secondary light energy;
b. in a non-measurement mode periodically increasing the light power of either or both of the primary and secondary light sources;
c. wherein the primary and secondary light sources are chosen so that the anti-Stokes light component of the primary light source is essentially the same as the wavelength of the secondary light source.

8. The method for automatic photo-bleaching of deployed optical fibers in a distributed temperature sensing system (DTS) of claim 1 wherein in the non-measurement mode a tertiary light source in the system is used for providing the higher power light for photo-bleaching.

9. The method for automatic photo-bleaching of deployed optical fibers in a distributed temperature sensing system (DTS) of claim 8 wherein the primary light source is a 1030 nm wavelength source and the secondary light source is a 990 nm wavelength source.

* * * * *